United States Patent
Wiggershaus et al.

Patent Number: 5,314,083
Date of Patent: May 24, 1994

[54] TELESCOPIC TOWER

[75] Inventors: Fred Wiggershaus, Gevelsberg; Udo Steffen, Castrop-Rauxel; Rudolf Erdmann, Gevelsberg, all of Fed. Rep. of Germany

[73] Assignee: Mannesmann AG, Düsseldorf, Fed. Rep. of Germany

[21] Appl. No.: 896,414

[22] Filed: Aug. 13, 1986

[30] Foreign Application Priority Data

Aug. 13, 1985 [DE] Fed. Rep. of Germany ....... 3528996

[51] Int. Cl.5 .............................................. B66C 17/06
[52] U.S. Cl. .................................... 212/213; 212/269
[58] Field of Search ............... 212/146, 147, 184, 267, 212/269, 213, 268; 182/142

[56] References Cited

U.S. PATENT DOCUMENTS

| 3,602,335 | 8/1971 | Gustectic | 182/142 |
| 4,168,008 | 9/1979 | Granryd | 212/269 |

FOREIGN PATENT DOCUMENTS

| 3508604 | 9/1985 | Fed. Rep. of Germany | 212/267 |
| 2134072 | 8/1984 | United Kingdom | 212/267 |

Primary Examiner—Michael S. Huppert
Assistant Examiner—Thomas J. Brahan
Attorney, Agent, or Firm—Ralf H. Siegemund

[57] ABSTRACT

A telescopic tower for suspension from an overhang trolley, crane, or the like, have a lowermost tube for carrying a work area or platform, is constructed in that the tubes are of polygonal cross-section with inwardly, as well as outwardly projecting rails in corners of the polygon, rollers on the respective tubes run on these rails.

7 Claims, 4 Drawing Sheets

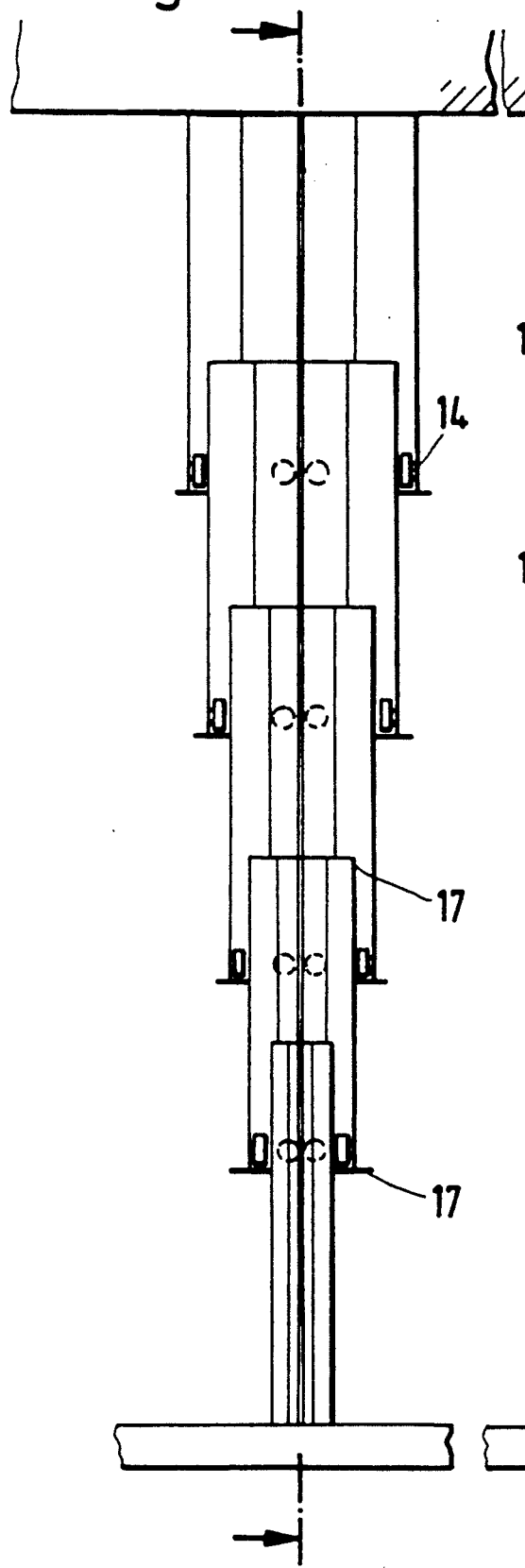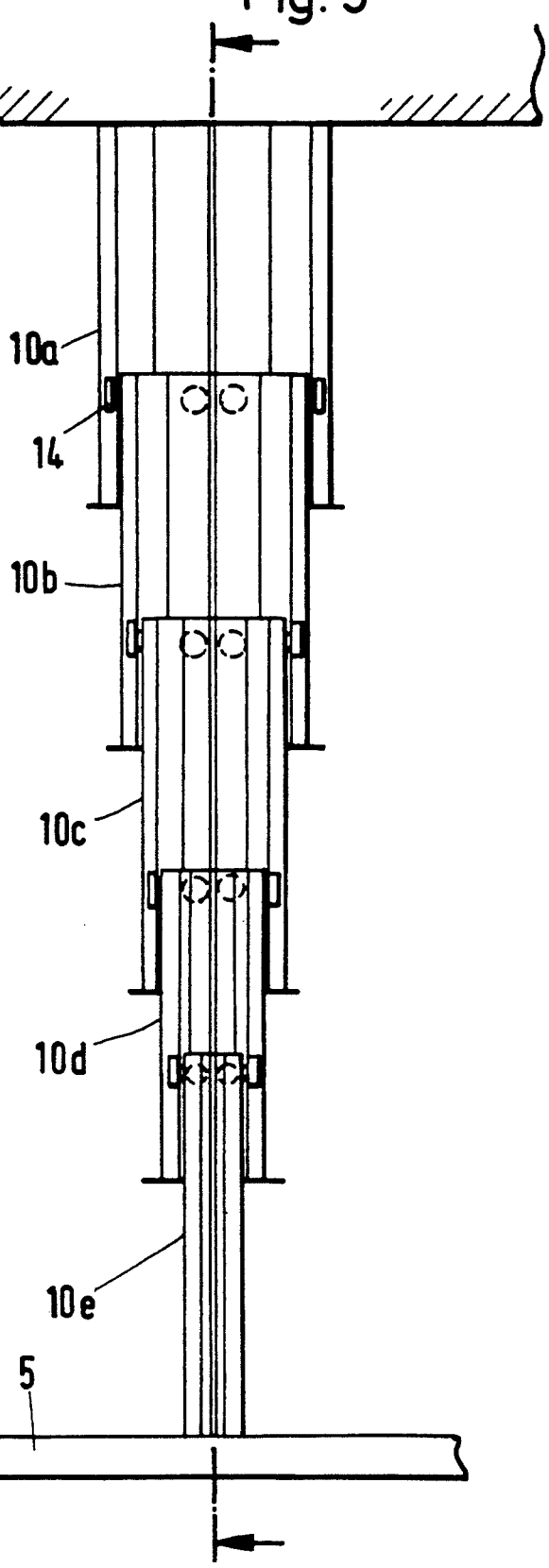

Fig. 4
Fig. 5
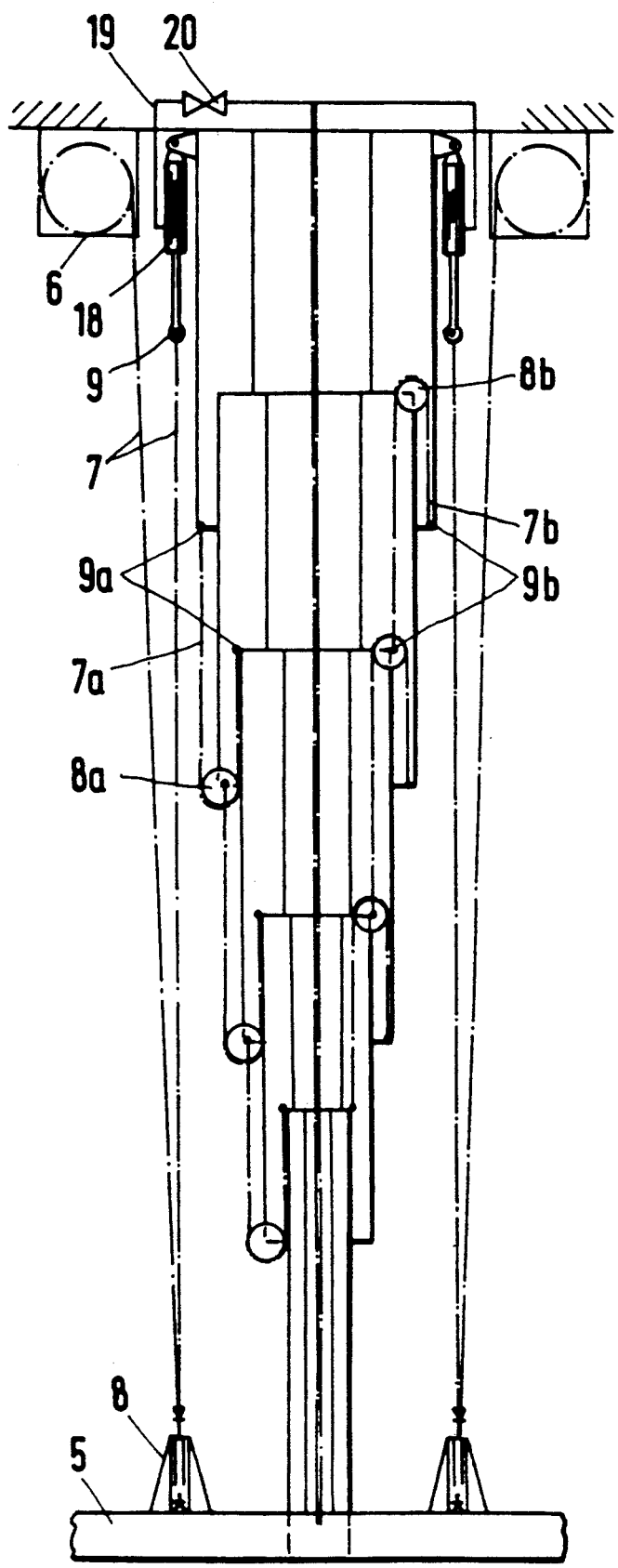
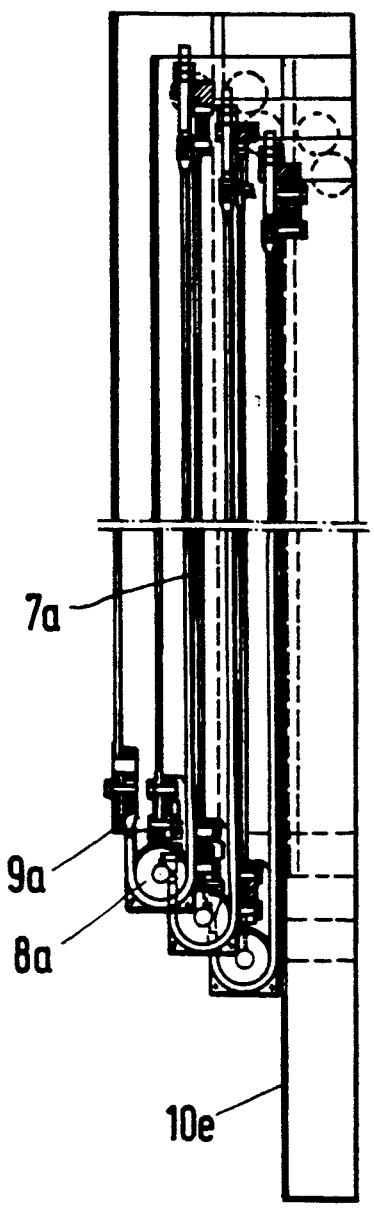

TELESCOPIC TOWER

BACKGROUND OF THE INVENTION

The present invention relates to a multi element telescopic tower wherein the elements are telescoped in relation to each other, one inside of another, and deployment as well as telescopic retraction is carried out under utilization of guide rollers, being arranged, as to each telescope tube, on the inside and the lower end, as well as on the outside and the upper end. Moreover, it is presumed that a work area, platform or the like is arranged underneath the lowest tube.

Generally speaking, a tower of the type to which the invention pertains is known through German printed patent application 24 06 387. A typical area of employment is in the field of maintenance, assembly or the like of large and wide body type airplanes. Herein the lifting path or height of the work area and/or platform exceeds 20 meters. The extension of the work area beyond the point of suspension is in the order of 6 meters, and often has to carry personnel, tools, as well as small scale lifting structure. Such auxiliary lifting structure, in turn, may be required to lift parts of, say, one metric ton (weight), up from ground and on to the platform. The known telescoping tower has guide rollers which abut the walls or frame structure of the tower which, therefore, have to take up compression forces. This requirement entails that these tower parts have to have unusual strength. Another drawback of this known construction is the fact that there is no connection which secures the platform against rotation.

DESCRIPTION OF THE INVENTION

It is an object of the present invention to provide a new and improved telescopic tower of the kind referred to above generally, and which permits save guiding of the telescopic process, procedure, and parts cooperating therewith.

It is a particular object of the present invention to provide a new and improved telescoping tower to be lowered for deployment from above, and wherein guide rollers are provided on the inside at the lower end of any of the telescopic tubes, as well as on the outside at the upper end thereof, and wherein the work area, platform or the like is suspended from the lowest telescopic tube, i.e. from the one to be lowered the most and without incurring rotation.

In accordance with the preferred embodiment of the invention, it is suggested to provide the telescopic tubes with a non-round, polygonal cross-section, the tube walls being segement strips and rails are arranged in corners and on the inside and/or the outside, for guide rollers to run on. Hence, only the rails have to be sufficiently strong to take up any force of engagement with the rollers, and they are, in fact, corner re-enforcements of the polygons. The tubes themselves do not have to have the requisite strength for the same purpose. The segments are made of sheet metal and may be strengthened through corrugations, creases, bosses, indents, or the like. Assuming the width of the uppermost tube to be about 5-600 mm, the thickness of these segment sheet elements does not have to exceed 3 mm. The strength producing indents or bosses, have to be spaced by about 150 mm. The polygon should be even numbered, preferably an octagonal one with rails arranged in every other corner. A polygonal contour holds the platform against rotation without further features but does not impede turning of the work platform into any desired position.

The rollers on a tube are arranged to engage guide rails from opposite sides, and the arrangement is such that of three tubes, a middle one carries rollers respectively running on rails that extend inwardly and outwardly, respectively, from the two other tubes of the telescopic arrangement. Moreover, for increase of stiffness, there may be ring disks or flanges. The telescopic tubes are fastened to a crane, a trolley or the like, by means of cable and, they are lowerable and liftable in unison, for lowering and raising the platform.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIGS. 2 and 3 simplified are cross-sections as mutually indicated, through a deployed tower, such as shown in FIG. 1, the figures show the roller arrangement;

FIG. 4 is a longitudinal section in a different section plane showing the cable suspension guidance and driving facilities;

FIG. 5 is a view similar to FIG. 4 but showing the telescopic tubing in fully rectracted disposition;

Figure 1:
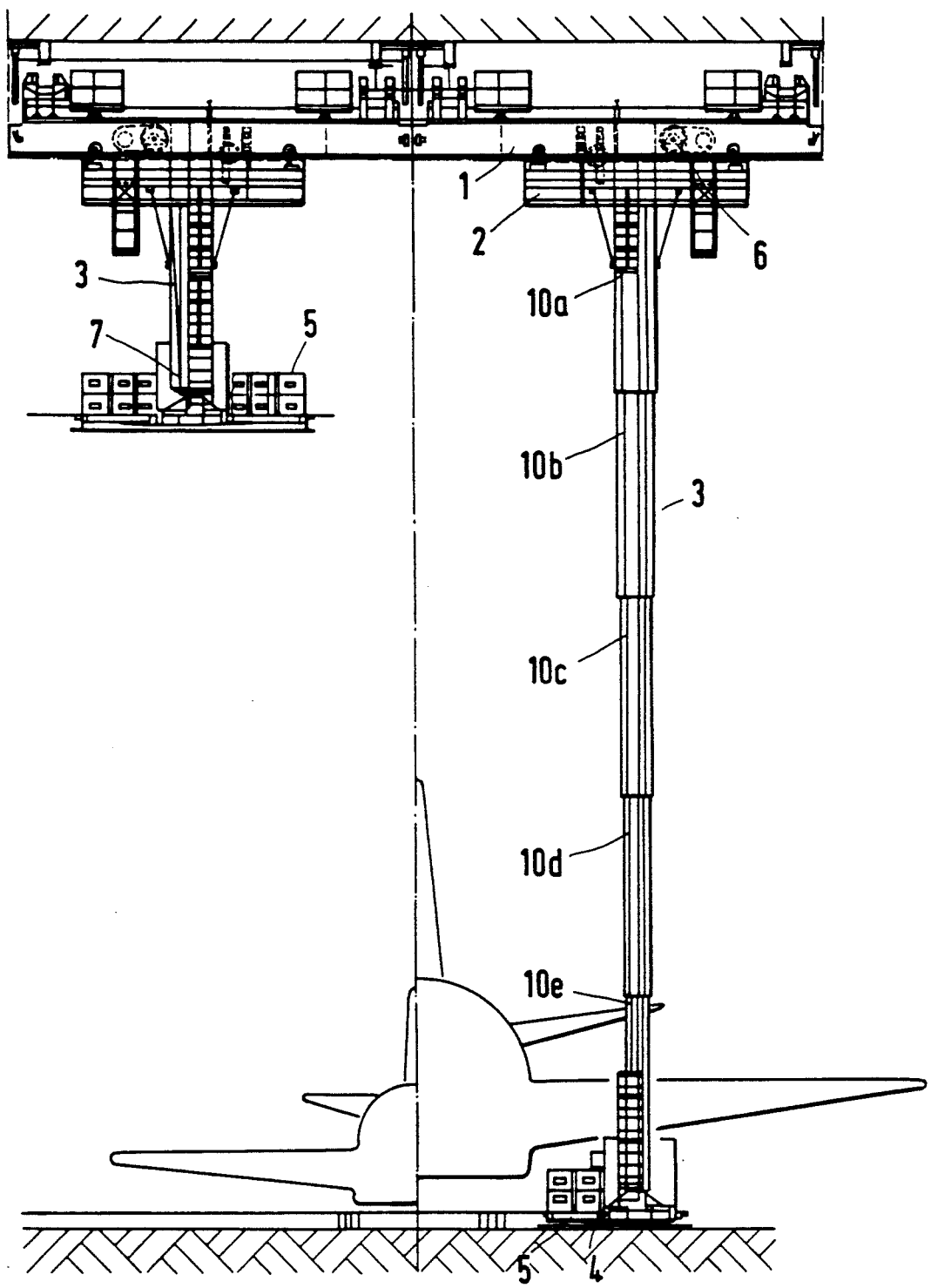
FIG. 1 is a side view of a preferred embodiment of the present invention for practicing the best mode thereof; the Figure can be construed in two different ways, the left hand and the right hand parts can be construed to refer to two different telescopes operating under different circumstances; they are shown in different modes of deployment, alternatively, the Figure can be construed to show two telescopic towers, both constructed in accordance with the preferred embodiment.

Proceeding now to the detailed description of the drawings, reference is made first to FIG. 1 and to the two cranes 1, each of which carrying a trolley 2, and from each trolley a telescopic tower 3 is suspended. The telescopic tower to the left is shown to be fully retracted, the tower to the right is shown to be fully deployed. Each telescopic tower 3 is comprised of an upper tube 10a fastened to the trolley and if undeployed, it receives four additional tubes 10b, c, d, and e. The lower tube 10e carries a work platform 5 with shelf space, drawers, etc., for spare parts, tools, etc., as well as a turning device 4 to swivel the platform around.

Each of the tubes 10a through 10e is about 8 meters long (roughly 25 feet) and, are (except for tube 10a) movable in vertical direction in a sense that any of the tubes 10b through 10e is movable in relation to the respective next and wider one, by about 6 meter or about 20 feet. For this, each trolley is provided with two lifting drives 6, e.g. winches, for ropes or cable 7 which are passed around pulleys 8 journalled in bearings on the platform and are run up again to suspension points 9, as can be seen specifically from FIGS. 4 and 5. These suspension points 9 are actually eyes on piston rods extending from hydraulic devices 18 which are pivotally suspended from the trolley. The winch drive raises and lowers the platform, thereby telescoping the tubes 10a through 10e into each other or deploy them in protracted state. The interiors of the hydraulic cylinders are interconnected through a conduit 19 and a valve 20. Upon extension of a cable, the respective piston rod of the other cable is pulled down. This is made possible through the fluid conduction between the two cylinder spaces, so that a balanced suspension obtains.

Upon retraction of the telescopic tubes, by the winches 6, additional cable 7a are used. They extend respectively between an anchoring point 9a on the lower end of one tube, via a pulley 8a on the lower end of the next tube and leading to an anchoring point 9a' on the upper end of still the next tube. This way, tubes 10a, b, c, are linked, so are tubes 10b, c, d, and 10c, d, e. As the winches lift the platform, these cable 7a etc. pull the tubes into each other.

Upon deployment and protraction of the telescopic arrangement, cable 7b come into play. They are provided also between two anchoring points, 9b and 9b', analogously to cable 7a. The points 9b and 9b' are thus likewise anchoring points at the lower end of an outer tube, and an upper end of an inner tube. Sheaves 8b are journalled on upper ends of the respective in-between tubes. This way, concurrent movement of all tubes is also ensured on lowering of the platform 5 by winches 6. The rope/cable and pulley arrangement as described permits selection of placing the radial spacing between the tubes to be as large as possible, so as to accommodate the guiding system to be described next.

FIGS. 2 and 3 illustrate a first set guide rollers 14a to be provided on the outside of each of the telscoped tubes and on the respective upper end thereof, while a second set of guide rollers 14b are provided on the inside and the lower end of each the tubes 10a through 10e. The rollers 14a and b are protected at the upper and lower ends of each tube by means of flange-like disks 17.

Figure 6:
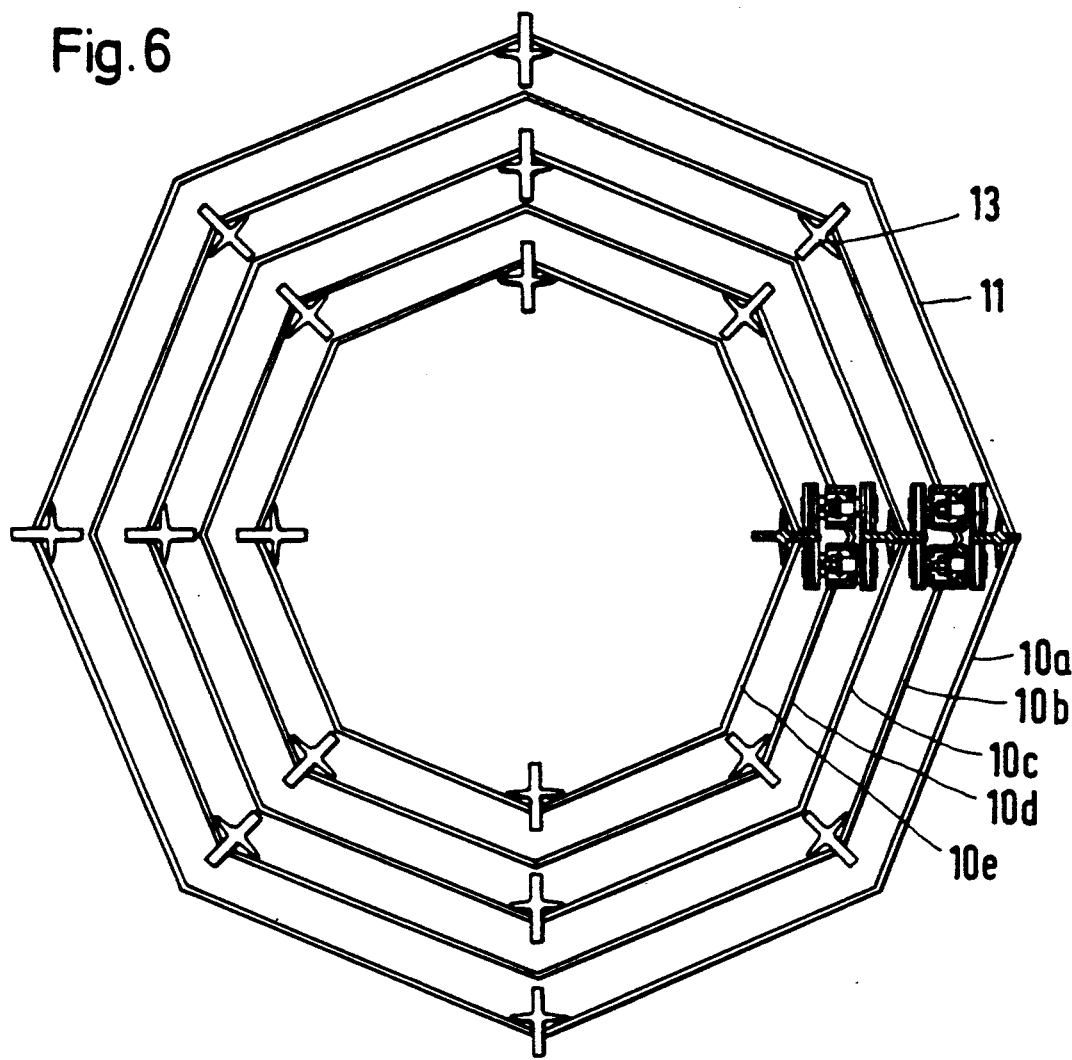
FIG. 6 is a cross-section through FIG. 5 indicated.
Figure 7:
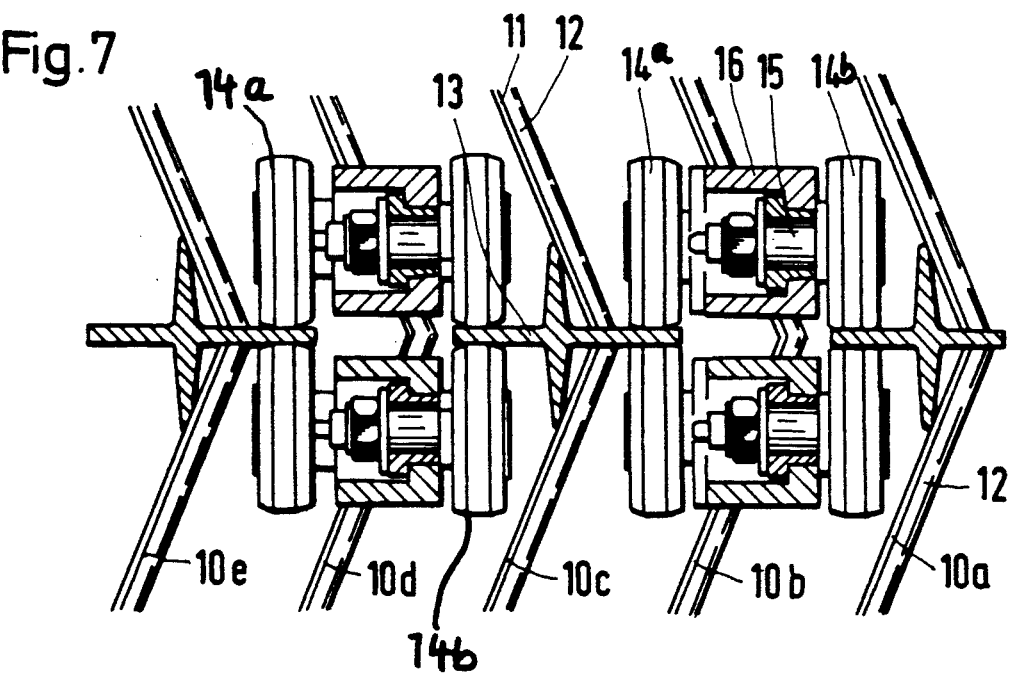
FIG. 7 illustrates a portion of FIG. 6 on a significantly enlarged scale.

FIG. 6 shows a cross-section through the retracted telescopic tower as shown otherwise in FIG. 5, and one can see specifically the arrangement of guide rollers 14a, b as they are arranged between individual segments 11 of the tubes, each being of octagonal cross-section. The segments 11 of the upper tube 10a, are about 550 mm wide. The segement 11 of the lowest tube is about 250 mm. These segments, sheets or strips are all about 3 mm thick and have horizontal projections for re-inforcement. FIG. 6, furthermore, reveals that guide rails 13 are arranged in every other corner of the octagon. These guide rails are of cross-like cross-section and have rail bars extending radially outwardly and inwardly. Details are depicted in FIG. 7.

The arrangement is such that the rails 13 of any tube, say 10c, have a first flange portion that extends towards tube 10b so that rollers 14a journalled near corners of tube 10b run on these rails, while rollers 14b are journalled on tube 10d, and run on the radially inwardly extending flange of the same rail 13 on tube 10c. The rails have a cross-like cross-section and the transverse flanges abut the segments 11 adjacent to the respective corner in which the rails is situated.

The invention is not limited to the embodiments described above; but all changes and modifications thereof, not constituting departures from the spirit and scope of the invention are intended to be included.

We claim:

1. In a multi tube telescopic tower for suspension from an overhang trolley, crane, or the like wherein the lowermost tube of a plurality of tubes carries a work area or platform, the improvement comprising:
   at least one (i) tube of the plurality of tubes of the telescopic tower being of multi part construction with a cross-section of a polygon, having corners accordingly, said (i) tube receiving another (ii) tube of the plurality of tubes and being received by a further (iii) tube of the plurality of tubes;
   said one (i) tube having rail means in at least one of said corners, said rail means extending radially inwardly, as well as radially outwardly from said corner; and
   rollers on the respective tubes (ii) and (iii) for cooperation with said rail means of said one (i) tube.

2. In a telescopic tower as in claim 1 wherein the parts of the multi part construction are of sheet metal configuration with reinforcing and stiffening corrugations or creases.

3. In a telescopic tower as in claim 1 wherein the cross-section of the tubes is an even numbered polygon, the rails being arranged along every other corner, the rollers being arranged adjacent thereto.

4. In a telescopic tower as in claim 3 wherein of three tubes of the plurality of tubes a middle one carries rollers on its inside and outside to respectively run on rails of the rails of the respective two other tubes.

5. In a telescopic tower as in claim 1 wherein said tubes are re-inforced at the respective lower end by raidally extending ring disks.

6. In a telescopic tower as in claim 1 including lifting means for lowering and raising the tubes together.

7. In a telescopic tower as in claim 1 wherein the rollers run in pairs on and against opposite sides of said rail means.

* * * * *